United States Patent [19]

Gabas et al.

[11] Patent Number: 5,315,892
[45] Date of Patent: May 31, 1994

[54] PRECISION LONGITUDINAL MOVEMENT TRANSMISSION CABLE

[75] Inventors: Carlos Gabas, Barcelona; Agustin Roca, Rubi, both of Spain

[73] Assignee: Pujol y Tarrago S.A., Rubi, Spain

[21] Appl. No.: 910,175

[22] PCT Filed: Nov. 14, 1991

[86] PCT No.: PCT/ES91/00077
  § 371 Date: Jul. 10, 1992
  § 102(e) Date: Jul. 10, 1992

[87] PCT Pub. No.: WO92/08904
  PCT Pub. Date: May 29, 1992

[30] Foreign Application Priority Data
Nov. 19, 1990 [ES] Spain .................. P9002923

[51] Int. Cl.$^5$ .................................... F16C 1/10
[52] U.S. Cl. .................. 74/502.3; 74/502.5; 74/500.5
[58] Field of Search ........... 74/500.5, 501.5 R, 502, 74/502.2, 502.3, 502.4, 502.6

[56] References Cited

U.S. PATENT DOCUMENTS

| | | | |
|---|---|---|---|
| 2,372,204 | 3/1945 | Herkert | 74/502.3 |
| 3,258,990 | 7/1966 | Bratz | 74/502.3 |
| 3,344,682 | 10/1967 | Bratz | 74/502.3 |
| 3,538,786 | 11/1970 | Coordes et al. | 74/502.3 |
| 4,238,973 | 12/1980 | Polo et al. | 74/502.3 |
| 4,542,661 | 9/1985 | Teramachi | 74/502.3 X |
| 5,105,678 | 4/1992 | Adelman et al. | 74/502.3 |

FOREIGN PATENT DOCUMENTS

| | | | |
|---|---|---|---|
| 610080 | 3/1935 | Fed. Rep. of Germany | 74/502.3 |
| 1129780 | 5/1962 | Fed. Rep. of Germany | 74/502.3 |
| 2404005 | 8/1975 | Fed. Rep. of Germany | 74/502.3 |
| 1316185 | 12/1962 | France | 74/502.3 |
| 2112703 | 6/1972 | France | 74/502.3 |
| 2190203 | 1/1974 | France | 74/502.3 |
| 308365 | 1/1965 | Spain | 74/502.3 |

*Primary Examiner*—Vinh T. Luong
*Attorney, Agent, or Firm*—Michael J. Striker

[57] ABSTRACT

The precision longitudinal movement transmission cable, includes a tubular casing (T) and a cylindrical central core (N) contained in the tubular casing (T) and having a plurality of radial projections (5) extending longitudinally over the entire core length and being provided with a central metal cable (4) for axial reinforcement. The longitudinally extending radial projections define a plurality of longitudinally extending equidistant channel-like grooves (6) and the cylindrical central core (N) fits in the tubular casing (T) so that it can slide and rotate. The transmission cable is also provided with a retaining device in each of the channel-like grooves (6) providing partitioning walls defining a plurality of compartments (9) of equal compartment length arranged in longitudinal succession along each of the channel-like grooves (6); and a plurality of balls (10), each of the balls being located in one of the compartments (9) of the channel-like grooves (6) and being dimensioned so that the balls can move snugly along an inner surface of the tubular casing (T) and in the channel-like groove (6) along the entire compartment length of the compartment (9) when the central core (N) is moved longitudinally. The retaining device can be a metal wire (7) uniformly helically coiled around the central core (N).

4 Claims, 1 Drawing Sheet

PRECISION LONGITUDINAL MOVEMENT TRANSMISSION CABLE

BACKGROUND OF THE INVENTION

The present invention relates to movement transmission cables and, more particularly, to a precision longitudinal movement transmission cable which is particularly applicable as a connecting member between the control lever and the automatic transmission of motor vehicles.

It is well known that in motor vehicles fitted with an automatic transmission as original equipment the connection between the gear lever mounted in the vehicle interior and the automatic transmission is effected by longitudinal movement transmission cable, unlike vehicles provided with a manual transmission as original equipment in which the connection between the gear lever and the transmission is effected generally by a set of articulated rigid metal rods.

The purpose of the longitudinal movement transmission cables is to transfer to the automatic transmission the movement that the driver applies to the gear lever. The flexible nature of these transmission cables is important for their use as a connecting member between the gear lever and automatic transmission in view of the relative positions of both, generally involving an undulating path for the connection.

Generally speaking, these longitudinal movement transmission cables are basically formed by a longitudinal central band or core housed in a casing adapted to the operational conditions of the cable. The central core may slide relative to the casing with the aid of bearings.

Among the known longitudinal movement transmission cables incorporating the novel features characterizing them which have been described in essence in the foregoing paragraphs, the following may be cited: French patent 70.39958, describing a longitudinal movement transmission cable wherein the central core consists of a continuous prismatic band longitudinally movable between two opposed rows of running members which respectively bear against a guide channel attached to the cable casing; French patent 73.15135, describes a longitudinal movement transmission cable comprising a longitudinally movable central prismatic core, two of the sides whereof bear on continuous bands provided with running members which bear against the inner surface of the cable casing; and Spanish patent 308,365, which describes a longitudinal movement transmission cable having a cylindrical central core longitudinally movable on running members housed in a plurality of interconnected supports concentric to the main core.

Generally speaking, the known embodiments of longitudinal movement transmission cables suffer from the fact that they comprise a large number of components parts are complex to make and assemble. This is their main drawback. On the one hand, all of this makes production and assembly costs comparatively more expensive and, on the other hand, causes comparatively frequent breakdowns and/or faulty operation of the cable.

SUMMARY OF THE INVENTION

It is an object of the present invention to provide a longitudinal movement transmission cable having a smaller number of components which are easier to make and assemble, than the known transmission cables, as well as a high degree of operational reliability.

The precision longitudinal movement transmission cable of the invention comprises a tubular casing of a structure and composition appropriate for each particular application and an essentially cylindrical central core of the same length as the tubular casing containing it and which is provided with a central axial reinforcement constituted by a metal cable. The central core is formed with a sufficient number of radial projections, at least three and preferably five, extending longitudinally without a break over the whole length of the central core, the radial projections defining corresponding equidistant channel-like grooves, the theoretical outside diameter given by the free ends of the radial extensions being smaller than the inside diameter of the tubular casing, so that the central core may slide and rotate about its own axis inside the tubular casing, wherein in each of the channel-like grooves retaining means which in the style of partition walls define a plurality of compartments of equal length in longitudinal alignment along the grooves, wherein in each of the compartments of the channel-like grooves a ball which, when the central core is housed in the tubular casing, may snugly roll along the inner surface of the tubular casing and on the surface of the channel-like groove of the central core containing it, along the whole length of the compartment when the central core is moved longitudinally in any direction.

In a preferred embodiment of the precision longitudinal movement transmission cable of the invention the retaining means on the central core consists of a metal wire uniformly helically wound about the whole length of the central core. This winding is housed in grooves which, angularly mating with the helically wound metal wire winding, are formed on the free ends of the radial projections of the central core, such that the metal wire defines in the channel-like grooves longitudinally adjacent compartments of like lengths.

The small number of components of the precision longitudinal movement transmission cable of the invention in comparison with the known embodiments, as well as the simplicity of manufacture and assembly of these components are fundamental factors in the reduction of production costs.

The cable of the invention also offers, because of its characteristic structure, a very high reliability and accuracy of operation, as well as a minimum wear of the constituent parts thereof which, under normal conditions of use, ensures a very high number of operations or movements of the central core relative to the casing in its reciprocating movements.

The tubular casing is, under conditions of use, attached at the respective ends thereof by corresponding connection terminals to the automatic transmission change lever and to the corresponding transmission mechanism.

The maximum length over which the central core may be longitudinally moved relative to the tubular casing of the precision longitudinal movement transmission cable of the invention is defined precisely by the retaining means of the central core and, in particular, by the length of the compartments the retaining means define in each of the channel-like grooves of the central core.

As described above, each ball housed in its corresponding compartment of the central core may roll simultaneously along the inner surface of the corresponding channel-like groove of the central core to the extent defined by the length of the compartments when a force sufficient to move the central core relative to the casing is applied to one of the ends thereof. When the ball reaches the retaining means defining the compartment in either of the two possible directions of movement of the central core and the force is held applied to one of the ends thereof, the ball may not continue rolling and could only continue moving by sliding and rubbing against the surfaces. By extension, this friction occurs all along the cable at the plurality of balls housed in their respective compartments defining the retaining means in the central core of the cable of the invention which means that, from the time when movement of the central core relative to the casing is such that the balls housed in the compartments of the central core reach the end of their rolling path in the compartments they then oppose the further movement of the central core with such a high resistance that it is necessary to use a very high force to continue moving the central core.

In the light of the foregoing, the precision longitudinal movement transmission cable of the invention may, on the one hand, transmit the longitudinal movement under the conditions described above and, on the other hand, it may limit such longitudinal movement, adapting it to the needs of each particular application, thereby preventing the mechanisms and/or devices receiving such longitudinal movement or, which is the same, receiving the traction and compression forces, from being exposed to mechanical overloads which frequently cause breakdowns and/or misfunctioning of the mechanisms and/or devices.

BRIEF DESCRIPTION OF THE DRAWINGS

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
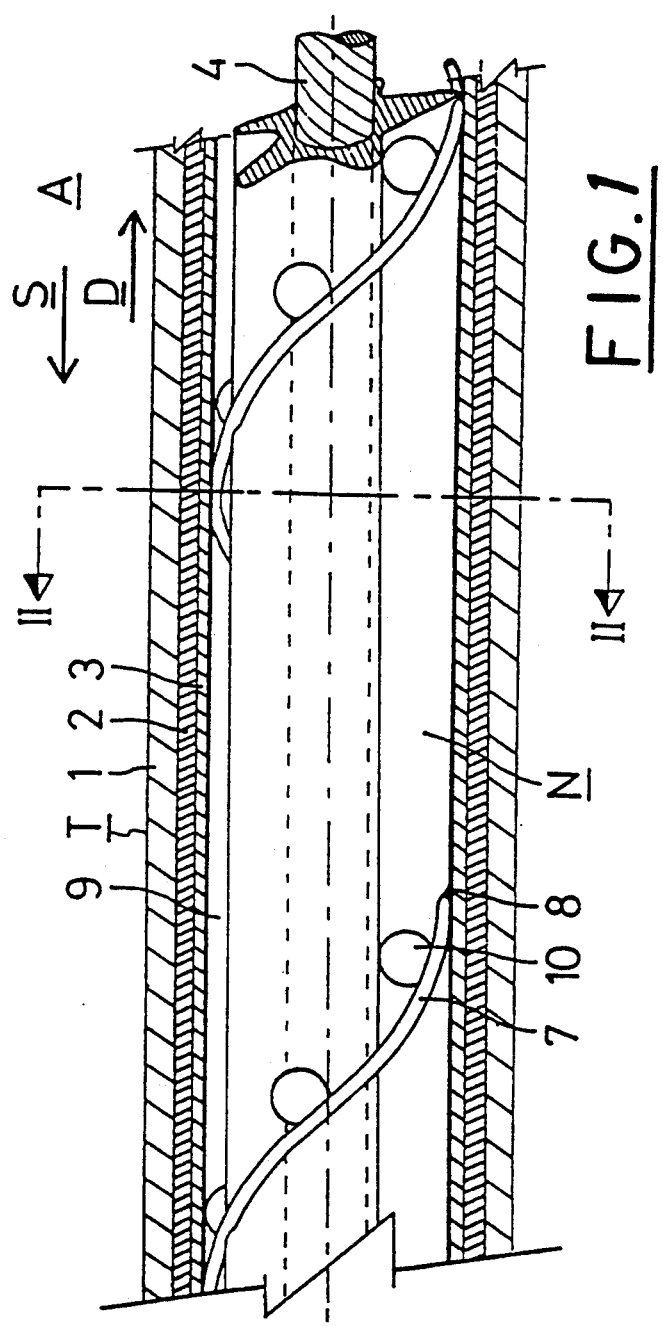
FIG. 1 is a longitudinal cross-sectional view of a preferred embodiment of the precision longitudinal movement transmission cable according to the invention.

The embodiment of the precision longitudinal movement transmission cable of the invention comprises a central core N and the tubular casing T containing it.

In this embodiment, the precision longitudinal movement of the transmission cable of the invention is, as said above, for connecting the gear lever arranged in the passenger compartment of the vehicle with the automatic transmission. To this end, the transmission cable is provided at both ends with corresponding connection terminals which, for greater clarity, have not been shown in the drawing sheet.

Figure 2:
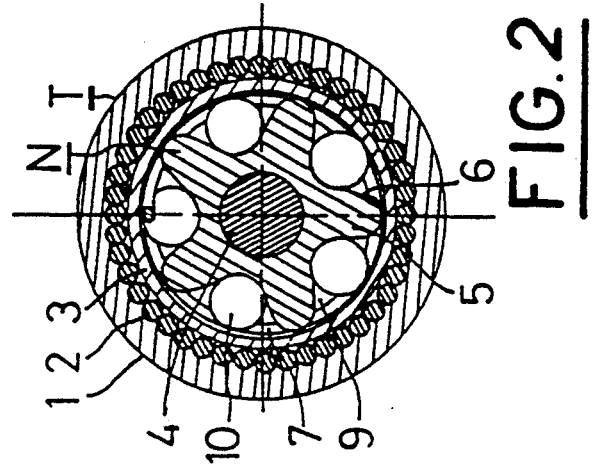
FIG. 2 is a transverse cross-sectional view of the transmission cable of FIG. 1 taken along the section line II—II of FIG. 1.

FIGS. 1 and 2 show that the tubular casing T comprises, in this embodiment of the precision longitudinal movement transmission cable of the invention, the outer protective sheath 1, a plurality of reinforcing cables 2 and a inner running sheath 3.

The outer protective sheath 1 and the inner running sheath 3 are preferably made of plastics materials of properties appropriate for their respective purposes.

The reinforcing cables 2, as shown in detail in FIG. 2, are arranged between the outer protective sheath 1 and the inner running sheath 3, being concentrically wound around the inner sheath 3 and extending all along the tubular casing T. The cables 2 are metallic and act as structural reinforcement for the casing T.

All the foregoing concerning the tubular casing T is well known and the tubular casing T may have any other composition and structure appropriate for the needs of each particular application of the precision longitudinal movement transmission cable of the invention.

FIG. 1 shows how the central core N is coextensive with the tubular casing T. The central core N is provided with a central axial reinforcement comprising the metal cable 4 coextensive with the central core N.

FIG. 2 shows how the central core N is essentially cylindrical and is formed with the identical equidistant radial projections 5 of which, in this embodiment, there are five. The number of radial projections 5 may vary depending on the needs of each particular application. It should be noted that the minimum number of radial projections 5 with which adequate working of the precision longitudinal movement transmission cable of the invention is obtained is three.

The radial projections 5 extend continuously along the central core N and have an essentially trapezial section, with the shorter ends thereof arranged at the free ends of radial projections, such as shown in FIG. 2.

FIG. 2 shows how the radial projections 5 are dimensioned in such a way as to define the curved profile channel-like grooves 6 which, like the radial projections 5, are coextensive in this embodiment with the central core N as shown in FIG. 1. Logically, the number of channel-like grooves 6 is the same as the number of radial projections 5.

The free ends of the radial projections 5 define, as shown in FIG. 2, the theoretical outside diameter of the central core N. This diameter, which is smaller than the inside diameter of the running sheath 3 of the tubular casing allows the central core N to slide longitudinally and rotate about itself snugly relative to the tubular casing T.

FIGS. 1 and 2 show how the metal wire 7 is uniformly helically wound around the central core N. This wire is positionally fixed relative to the central core N by the action of the transverse grooves 8 which, forming the same angle relative to the center axis of the central core N as defined by the helical winding of the metal wire 7, are formed in the free ends of the radial projections 5 of the central core N.

The transverse grooves 8 are dimensioned in such a way as snugly to contain the portions of the metal wire 7 crossing therethrough. In this way, the metal wire 7 does not project outwardly relative to the central core N, as shown in FIGS. 1 and 2.

FIG. 1 shows how the metal wire 7 helically wound around the central core N, defines in the channel-like grooves 6, the longitudinal compartments 9 which are of equal length and transversely adjacent along the central core N. These compartments 9 are thus longitudinally bounded by the portions of metal wire 7 angularly arranged across them and transversely by the radial projections 5 of the central core N.

In each of the compartments 9, as shown in FIG. 1, there is housed a preferably metallic, and to be more precise, a steel ball 10, the diameter of which allows the ball 10 simultaneously to roll along the inner surface of the running sheath 3 of the tubular casing T and roll over the surface of the channel-like groove 6 of the central core N when the central core N is in the tubular casing T and is moved longitudinally relative thereto.

When the precision longitudinal movement transmission cable of the invention is fixed at both ends thereof, by corresponding connection terminals, respectively to the gear lever and to the automatic transmission, it works as follows:

FIG. 1 shows the position occupied by the central core N relative to the tubular casing T when no force is being applied to the central core N. Under these conditions, the balls 10, housed in their respective compartments 9, occupy the position shown in FIG. 1, i.e. touching the metal wire 7 which, as said above, longitudinally bounds the ends of each of the compartments 9, the balls 10 being retained in this position by the snug fit with which they are housed in their respective compartments 9, under normal conditions of use of the cable of the invention;

when a sufficient force is applied to the end A of the central core N in the direction S in FIG. 1, the central core N is moved longitudinally of the tubular casing T in the direction S bearing on the balls 10 which roll simultaneously on the inner surface of the running sheath 3 of the tubular casing T and on the inner surface of the channel-like grooves 6 of the central core N whereby the longitudinal movement of the central core N relative to the tubular casing T is sufficiently approximate to twice the longitudinal movement of the balls 10;

when the balls 10 reach the opposite end of their respective compartments 9, if the force is maintained on the end A of the central core N in the direction marked as S, the balls 10 are prevented from continuing to roll by the metal wire 7, so that they may only continue moving by sliding and rubbing against the surfaces, i.e. the inner surface of the running sheath 3 and the surface of the channel-like grooves 6;

therefore, the joint friction produced under the conditions described immediately above by the plurality of balls 10 housed in their respective compartments 9 of the central core N prevents the central core N from continuing to move longitudinally under normal conditions of use, and in order to obtain continued longitudinal movement of the central core N, it is necessary to apply a much greater force than initially applied to the end A thereof. In this way, as said above, the joint action of the metal wire 7 and of the balls 10 effectively mark the limits of the maximum distance over which the central core N may be moved longitudinally relative to the tubular casing T;

the return of the central core N to the preciously described initial position requires a force of sufficient magnitude to be applied in the opposite direction, marked D in FIG. 1, to S to the end A whereby the central core N will be moved in direction D until the balls 10 reach the position shown in FIG. 1 where the process described in the foregoing paragraphs can be repeated.

While the invention has been illustrated and described as embodied in a precision longitudinal movement transmission cable, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A precision longitudinal movement transmission cable for transmitting a longitudinal movement, comprising: a tubular casing (T) extending longitudinally and having a casing length; a cylindrical central core (N) having a core length and being contained in the tubular casing (T), said casing length being substantially equal to said core length, said central core (N) having a plurality of longitudinally extending radial projections (5) extending longitudinally over the core length and being provided with a central metal cable (4) for axial reinforcement, said radial projections defining a plurality of longitudinally extending equidistant channel-like grooves (6) in the central core (N) and said radial projections (5) having free ends defining an outside diameter of the cylindrical central core (N) related to an inside diameter of the tubular casing (T) such that the cylindrical central core (N) slides and rotates inside said tubular casing (T); retaining means in each of said channel-like grooves (6) acting as partition walls defining a plurality of compartments (9) of equal compartment length and in longitudinal succession along each of said channel-like grooves (6); and a plurality of balls (10), each of said balls being located in one of said compartments (9) of the channel-like grooves (6) and being dimensions so that said balls move snugly along an inner surface of the tubular casing (T) and in the channel-like groove (6) along the entire compartment length of said compartment (9) when the central core (N) is moved longitudinally, the retaining means on the central core (n) consisting of a metal wire (7) uniformly helical bound about the entire core length of said central core (n), said metal wire being at least partly accommodated in a plurality of grooves (8) provided in the central core (N) in the vicinity of free ends of the radial projections (5) thereof so that the metal wire (7) defined equal-length longitudinally adjacent ones of the compartments (9) in the channel-like grooves (6).

2. A precision longitudinal movement transmission cable according to claim 1, wherein the number of radial projections is three.

3. A precision longitudinal movement transmission cable according to claim 1, wherein the number of radial projections is five.

4. A precision longitudinal movement transmission cable for transmitting a longitudinal movement, comprising: a tubular casing (T) extending longitudinally and having a casing length; a cylindrical central core (N) having a core length and being contained in the tubular casing (T), said casing length being substantially equal to said core length, said central core (N) having a plurality of longitudinally extending radial projections (5) extending longitudinally over the core length and being provided with a central metal cable (4) for axial reinforcement, said radial projections defining a plurality of longitudinally extending equidistant channel-like groove (6) in the central core (N) and said radial projections (5) having free ends defining an outside diameter of the cylindrical central core (N) related to an inside diameter of the tubular casing (T) such that the cylindrical central core (N) slides and rotates inside said tubular casing (T); retaining means in each of said channel-like grooves (6) acting as partition walls defining a plurality of compartments (9) of equal compartment length and in longitudinal succession along each of said channel-like grooves (6); and a plurality of balls (10), each of said balls being located in one of said compartments (9) of the channel-like grooves (6) and being dimensions so that said balls move snugly along an inner surface of the tubular casing (T) and in the channel-like groove (6) along the entire compartment length of said compartment (9) when the central core (N) is moved longitudinally, the tubular casing comprising a plastic outer protective sheath (1), a plurality of reinforcing cables (2) and an inner plastic running sheath (3), said reinforcing cables (2) being located between said plastic outer protective sheath (1) and said inner plastic outer protective sheath (3).

* * * * *